United States Patent
Kase (10) Patent No.: US 7,692,772 B2
(45) Date of Patent: Apr. 6, 2010

(54) APPARATUS AND A METHOD FOR MEASURING DISTANCE USING A LASER BEAM

(75) Inventor: Teiji Kase, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 12/042,824

(22) Filed: Mar. 5, 2008

(65) Prior Publication Data

US 2008/0218729 A1    Sep. 11, 2008

(30) Foreign Application Priority Data

Mar. 8, 2007    (JP)    ............... 2007-058889

(51) Int. Cl.
  *G01C 3/08*    (2006.01)
(52) U.S. Cl. ................ 356/5.01; 356/5.1; 356/5.15
(58) Field of Classification Search ........... 356/3.01–22
  See application file for complete search history.

(56) References Cited

U.S. PATENT DOCUMENTS 4,829,533 A * 5/1989 Hallberg et al. ........ 372/29.021
5,185,643 A * 2/1993 Vry et al. .................... 356/506
5,285,256 A * 2/1994 Nelson et al. ............... 356/342

FOREIGN PATENT DOCUMENTS

JP    11287859 A    10/1999
JP    2006030181 A    2/2006

* cited by examiner

*Primary Examiner*—Thomas Tarcza
*Assistant Examiner*—Luke D Ratcliffe (57) ABSTRACT

A laser distance measuring apparatus which measures a turn-around time after emitting a laser beam outputted from a laser diode to a target until receiving the laser beam reflected by the target by a light receiving module via a band-pass filter to calculate a distance to the target, includes temperature control module for adjusting a temperature of the laser diode; level detecting module for detecting a level of the reflected laser beam received via the band-pass filter; main control module for outputting a temperature control signal to the temperature control module so that the level is kept in a predetermined range.

6 Claims, 6 Drawing Sheets

APPARATUS AND A METHOD FOR MEASURING DISTANCE USING A LASER BEAM

INCORPORATION BY REFERENCE

This application is based upon and claims the benefit of priority from Japanese Patent Application No. 2007-058889, filed on Mar. 8, 2007, the disclosure of which is incorporated herein in its entirety by reference.

BACKGROUND OF THE INVENTION

1. Technical Field

The present invention relates to an apparatus and a method for distance measurement to a target using a laser beam.

2. Background Art

An apparatus for laser distance measurement measures a distance to a desired target based on a length of time between a time of emitting the laser beam to the target and a time of receiving the laser beam reflected by the target (hereinafter, "turnaround time").

For example, Japanese Patent Application Laid-Open No. 1999-287859 discloses a laser distance measuring apparatus, which includes a laser element that emits the laser beam to a target, a laser driving module which drives the laser element, and a detecting module that receives the laser beam reflected by the target and detects a serrate wave signal mixed with the emitted laser beam mixed in the reflected laser beam. The detecting module includes a band-pass filter which allows a frequency component within a predetermined frequency band of the serrate wave signal to pass, and a signal level measuring module for measuring level of a signal which passes the band-pass filter.

Japanese Patent Application Laid-Open No. 2006-030181 discloses a method for measuring a distance by a chromatic dispersion focusing element which focusing a laser beam at a point on a target face.

A laser distance measuring apparatus above mentioned is applied to various fields. In particular, the distance measuring apparatus may be applied to space rendezvous in which a transporting spacecraft (e.g. the Space Shuttle) docks with either an artificial satellite or a space station. Such distance measuring apparatus requires high accuracy, high reliability and wide dynamic range. Similarly, the distance measuring apparatus may be applied to a guided landing of a helicopter. In such a field, high accuracy, high reliability and wide dynamic range are also required.

The transporting space vehicle includes the distance measuring apparatus in order to dock with either the artificial satellite or the space station. Each of the artificial satellite and the space station includes a marker used for a target of the laser beam.

The distance measuring apparatus emits a pulsed laser beam to the target. A scanner scans the target in a two-dimensional manner by the pulsed laser beam. Then, the distance measuring apparatus measures the turnaround time of the pulsed laser beam and data on an emitting angle of the pulsed laser beam. Information on a distance to the target is obtained on the basis of the turnaround time, and information on a target position is obtained on the basis of the data on the emitting angle.

The receiving light level (an amount of a receiving light) of the laser beam fluctuates within a level which is $10^6$ or $10^7$ times higher than a predetermined initial value according to a distance to the target. For this reason, an amplifier in a light detector and a light receiver may be saturated, and an electric signal which is converted from a light signal may be distorted consequently. The signal distortion degrades precision of distance measurement.

Thus, a gain of the light detector is changed according to the receiving light level, or a variable wavelength filter is installed in an optical path. Accordingly, degradation of precision of distance measurement due to the fluctuation of the receiving light level is prevented.

However, changing the gain of the light detector cannot compensate the signal distortion completely, and may cause increasing noises. The signal distortion and the noises degrade precision of distance measurement. For this reason, when the gain of the light detector is changed, fluctuation of the receiving light level to be allowed is limited in the range of only a level which is $10^4$ times higher than the predetermined initial value.

Meanwhile, optically changing the receiving light level, the variable filter is not so influential to the precision of the distance measurement. However, in the existing variable wavelength filter, the filter is mechanically driven to change transparence. Thus, it is difficult for the variable wavelength filter to guarantee reliability requested for a space apparatus.

According to the variable wavelength filer, the receiving light level fluctuation to be allowed is limited in the range of only a level which is $10^4$ times higher than the predetermined initial value. Accordingly, in order to treat fluctuation of a receiving light level which is $10^6$ times higher than the predetermined initial value, it is necessary for the variable wavelength filter to be used together with another apparatus or method.

SUMMARY

A main purpose of the present invention is to provide an apparatus and method for measuring distance using laser beam, which can secure a required dynamic range through coping with widely fluctuated level of a receiving light, and prevent moving parts from degrading reliability.

A laser distance measuring apparatus which measures a turnaround time after emitting a laser beam outputted from a laser diode to a target until receiving the laser beam reflected by the target by a light receiving module via a band-pass filter to calculate a distance to the target, according to an exemplary aspect of the present invention includes a temperature control module for adjusting a temperature of the laser diode; a level detecting module for detecting a level of the reflected laser beam received via the band-pass filter; a main control module for outputting a temperature control signal to the temperature control module so that the level is kept in a predetermined range.

BRIEF DESCRIPTION OF THE DRAWINGS

Exemplary features and advantages of the present invention will become apparent from the following detailed description when taken with the accompanying drawings in which.

EXEMPLARY EMBODIMENT

Exemplary embodiments of the present invention will now be described in detail in accordance with the accompanying drawings.

Figure 1:
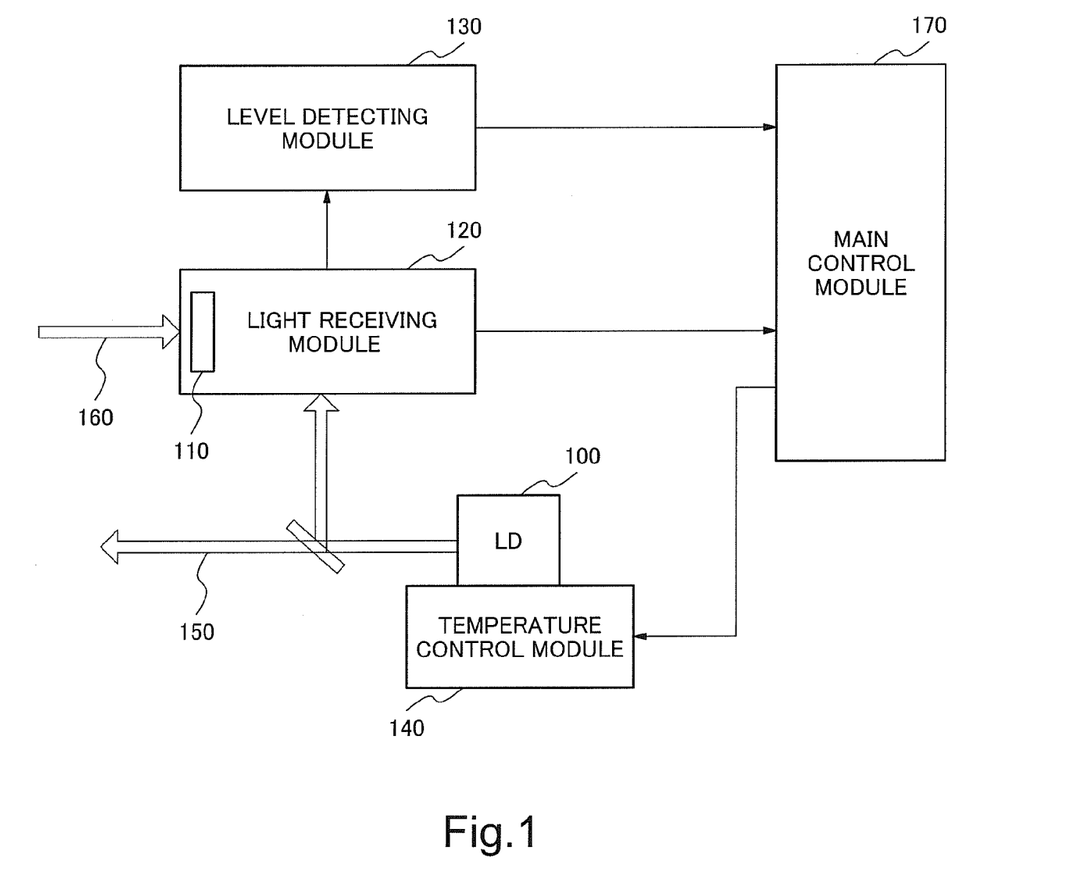
FIG. 1 is a block diagram showing a basic configuration of a laser distance measuring apparatus according to an exemplary embodiment of the present invention.

FIG. 1 is a block diagram showing a basic configuration of a laser distance measuring apparatus according to an exemplary embodiment of the present invention.

The laser distance measuring apparatus includes a LD (laser diode) 100 which emits a laser beam 150 to a target, a light receiving module 120 which includes a band-pass filter 110 and converts a received light 160 reflected by the target to an electric signal, a level detecting module 130 which detects a level of the reflected light, a temperature control module 140 which controls a temperature of the LD, and a main control module 170 which calculates a distance to the target on the basis of the electric signal outputted by the light receiving module 120 and outputs a temperature control signal for controlling a temperature of the LD 100 on the basis of a signal from the level detecting module 130.

The reflected light reflected by the target varies according to the distance to the target. An amount of a receiving laser beam which the light receiving module 120 receives varies together with the change of the reflected light. Fluctuation of the amount of the receiving light causes fluctuation of the converted electric signal. When there is too much amount of the receiving light, an amplifier or the like becomes saturated. Thus precision of distance measurement becomes degraded. When there is too less amount of the receiving light, SN (Signal to Noise) ratio becomes decreased. Consequently, the precision of the distance measurement becomes degraded.

To cope with the above mentioned problems, a temperature of the laser diode is controlled so that a central wavelength of the laser beam outputted therefrom changes. Consequently, the amount of receiving light falls within a predetermined range Detailed descriptions are as follows.

Figure 2:
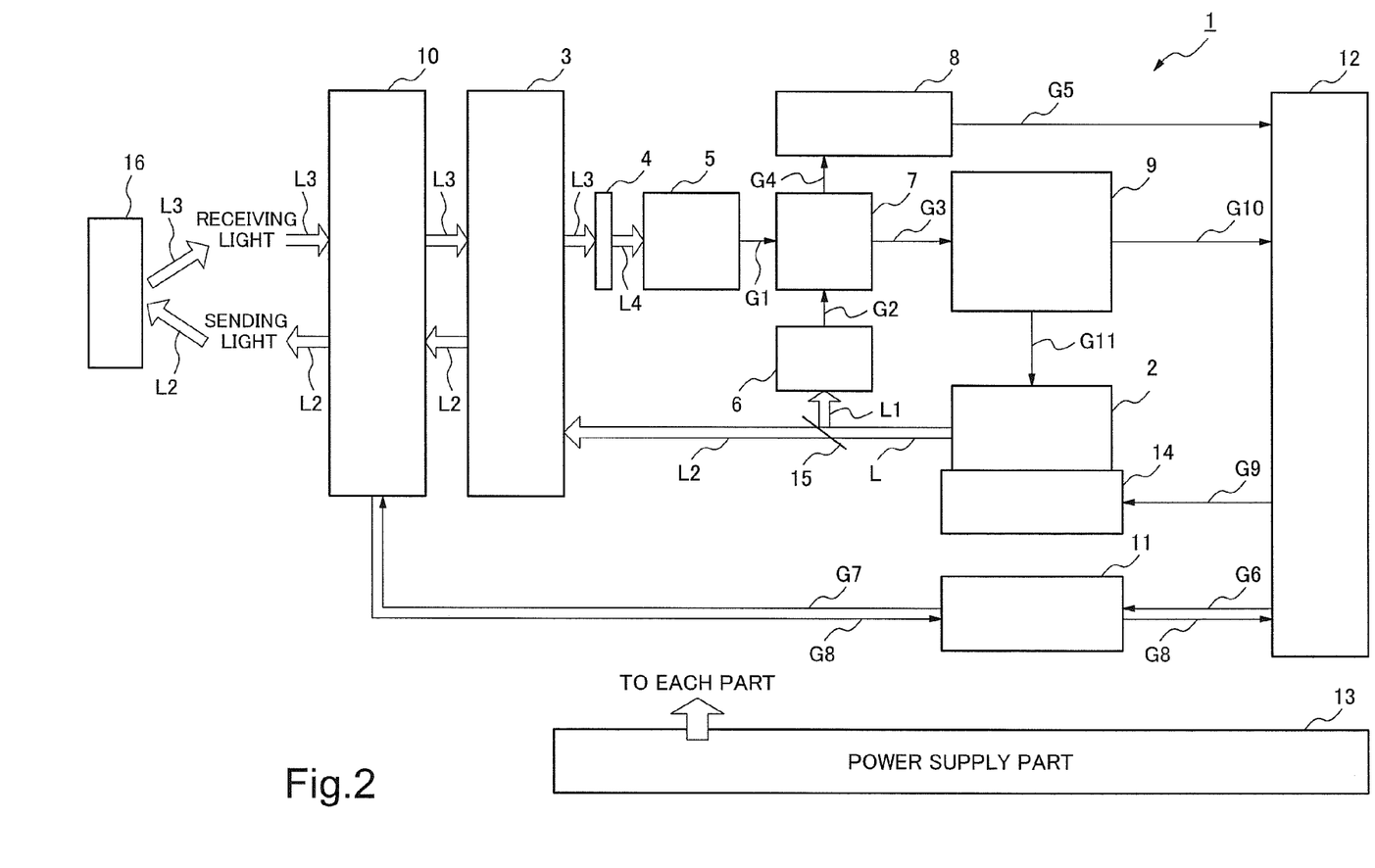
FIG. 2 is a block diagram showing a detailed configuration of the laser distance measuring apparatus according to the exemplary embodiment of the present invention.

FIG. 2 is a block diagram showing a detailed configuration of the laser distance measuring apparatus. The laser distance measuring apparatus according to the exemplary embodiment is an example of the laser distance measuring apparatus for the space rendezvous in which a transport spacecraft is docked with an artificial satellite, a space station or the like.

The laser distance measuring apparatus 1 includes a laser diode 2, an optical processing part 3, a band-pass filter 4, a receiving light detecting part 5, a sending light detecting part 6, a light receiving part 7, a level detecting part 8, a counting part 9, a scanning part 10, a scanner driving part 11, a main control part 12, a power supply part 13, a temperature control part 14, and a beam splitter 15.

The laser diode 2 outputs a laser beam L, whose wavelength is about 800 nm, to the beam splitter 15. The laser beam L is outputted as a pulsed light. In following descriptions, the pulsed laser beam is described as the laser beam.

The laser diode 2 is made of semiconductor, and a band gap thereof is dependent on a temperature thereof. Therefore, the wavelength of the laser beam changes according to the temperature. For example, when the laser diode 2 outputs the laser beam whose wavelength is 800 nm at a predetermined temperature and the temperature becomes high by 1° C., the wavelength becomes about 0.3 nm longer than one at the predetermined temperature.

The beam splitter 15 divides the pulsed laser beam outputted from the laser diode 2 into two laser beams. One laser beam L2 of the two laser beams is emitted to a target 16 via the optical processing part 3 and the scanning part 10. The other laser beam L1 is outputted to the sending light detecting part 6.

The optical processing part 3 shapes a waveform of the emitted laser beam L2, and sends a received light L3 to the receiving light detecting part 5.

The band-pass filter (e.g. interference filter) 4 optically selects predetermined wavelengths among wavelengths of the receiving light L3 and passes the selected wavelengths. That is, the band-pass filter 4 removes background lights included in the receiving light L3 and passes a laser beam L4 which is reflected by the target 16.

The receiving light detecting part 5 receives the laser beam L4, converts the laser beam L4 into an electric signal and outputs the electric signal to the light receiving part 7 as a receiving signal G1.

The sending light detecting part 6 converts the laser beam received via the beam splitter 15 into an electric signal and outputs the electric signal to the light receiving part 7 as a sending signal G2.

The light receiving part 7 amplifies the receiving signal G1 and the sending signal G2 respectively, generates a timing signal G3 based on the amplified receiving signal G1 and sending signal G2, and outputs the timing signal G3 to the counting part 9. Moreover, the light receiving part 7 outputs the amplified receiving signal G1 to the level detecting part 8 as a level detecting signal G4.

The timing signal G3 is, for example, a pulse signal which rises when a level of the amplified sending signal G2 exceeds a predetermined threshold level and falls when a level of the amplified receiving signal G1 exceeds a predetermined threshold level. A pulse width of the pulse signal corresponds to a time difference between the receiving signal G1 and the sending signal G2.

The level detecting part 8 receives the level detecting signal G4 from the light receiving part 7 to detect a value corresponding to a peak level of the laser beam L4 and outputs the peak level to the main control part 12 as a receiving light level signal G5.

The counting part 9 measures the turnaround time of the emitted and received laser beam on the basis of the timing signal G3 outputted from the light receiving part 7, and outputs the turnaround time to the main control part 12 as a count signal G10. In order to measure the turnaround time, for example, clock pulses are counted while the timing signal G3 is rising. Then, the number of clock pulses is outputted as the count signal G10.

Further, the counting part 9 outputs an periodical signal G11 for oscillating the laser diode 2. The periodical signal G11 is a pulse signal having a predetermined frequency, for example, 20 KHz. The laser diode 2 outputs the laser beam with a time cycle corresponding to the predetermined frequency.

The scanning part 10 scans the target 16 with the laser beam L2 in a two dimensional manner. The scanner driving part 11 receives a scanner control signal G6 from the main control part 12 and sends a scanner driving instruction G7 to the scanning part 10 based on the scanner control signal G6. Furthermore, the scanning part 10 outputs an angle signal G8 to the main control part 12 via the scanner driving part 11.

The temperature control part 14 receives a temperature control signal G9 from the main control part 12 to control a temperature of the laser diode 2 based on the temperature control signal G9. The temperature control part 14 having a Peltier device or the like heats and cools the laser diode 2.

As mentioned above, the main control part 12 outputs the scanner control signal G6 to the scanner driving part 11 and receives the angle signal G8 which indicates location information from the scanner driving part 11. Moreover, the main control part 12 receives a count signal G10 which indicates distance information from the counting part 9 to calculate a position of the target 16 and a distance to the target 16 based on the angle signal G8 and the count signal G10.

The main control part 12 receives the receiving light level signal G5 from the level detecting part 8 and outputs the temperature control signal G9 to the temperature control part 4 according to the receiving light level signal G5. The power supply module 13 supplies electric power to each part of the apparatus 1.

The laser distance measuring apparatus 1 operates as follows. First, the laser diode 2 oscillates according to an periodical signal G11 generated by the counting part 9 and outputs the pulsed laser beam L. The laser beam L is divided by the beam splitter 15 into two laser beams, that is, the laser beam L1 which is leaded to the sending light detecting part 6, and the laser beam L2 which is leaded to the optical processing part 3.

The laser beam L1 is converted to an electric signal by the sending light detecting part 6, and the electric signal is inputted to the light receiving part 7 as the sending signal G2. Meanwhile, the laser beam L2 is shaped by the optical processing part 3. The shaped laser beam L2 is inputted to the scanning part 10.

The scanning part 10 scans the target 16 with the laser beam L2 in a two dimensional manner according to the scanner driving instruction G7 which is generated by the scanner driving part 11. The angle signal G8 indicates angle data which specifies an emitting direction of the laser beam L2 during the two dimensional scanning. The scanning part 10 outputs the angle signal G8 to the main control part 12 via the scanner driving part 11.

The receiving light L3 which includes the reflected light by the target 16 is inputted to the band-pass filter 4 via the scanning part 10 and the optical processing part 3. The band-pass filter 4 is a device which passes lights within a predetermined wavelength band.

The pass band of the band-pass filter 4 covers wavelengths of the laser beam which the laser diode 2 outputs at the predetermined temperature. Accordingly, the receiving light L3 including background lights changes into the laser beam L4 without the background lights after passing the band-pass filter 4.

Further, a standard temperature of the laser diode 2 is a usual temperature in operating environment. For example, suppose that the laser distance measuring apparatus is used for the space rendezvous in which the transport spacecraft is docked with the artificial satellite and the space station. In such a case, since the distance measuring apparatus is usually temperature-controlled, a controlled temperature of the apparatus is the standard temperature of the laser diode 2. When the laser distance measuring apparatus is used on the surface of the Earth, an earth surface temperature is considered to be the standard temperature of the laser diode 2.

The laser beam L4 is received by the receiving light detecting part 5 to be converted to an electric signal thereby. The receiving light detecting part 5 outputs the electric signal to the light receiving part 7 as the receiving signal G1. As a result, the light receiving part 7 receives the receiving signal G1 from the receiving light detecting part 5 and the sending signal G2 from the sending light detecting part 6.

The light receiving part 7 amplifies the receiving signal G1 and sending signal G2 respectively. Further, the light receiving part 7 generates the timing signal G3 based on the amplified receiving signal G1 and sending signal G2 and outputs the signal G3 to the counting part 9. Pulse width of the timing signal G3 corresponds to the phase difference of the receiving signal G1 and the sending signal G2. Accordingly, the phase difference of the receiving signal G1 and the sending signal G2 can be measured, if clock pulses are counted while the timing signal G3 is rising.

The counting part 9 outputs the number of clock pulses to the main control part 12 as the count signal G10. The main control part 12 calculates a distance to the target 16 using the count signal G10 and a position (direction) of the target using the angle signal G8, according to predetermined formulas.

The light receiving part 7 outputs the amplified receiving signal G1 to the level detecting part 8 as the level detecting signal G4. The level detecting part 8 detects a peak value of the level detecting signal G4 and outputs the peak value to the main control part 12 as the receiving light level signal G5.

An amount of receiving laser beam which is received by the receiving light detecting part 5 fluctuates within a level which is 106 or 107 times higher than a predetermined initial value according to a distance to the target.

Then, the main control part 12 controls a temperature of the laser diode 2 based on the receiving light level signal G5.

Figure 3:
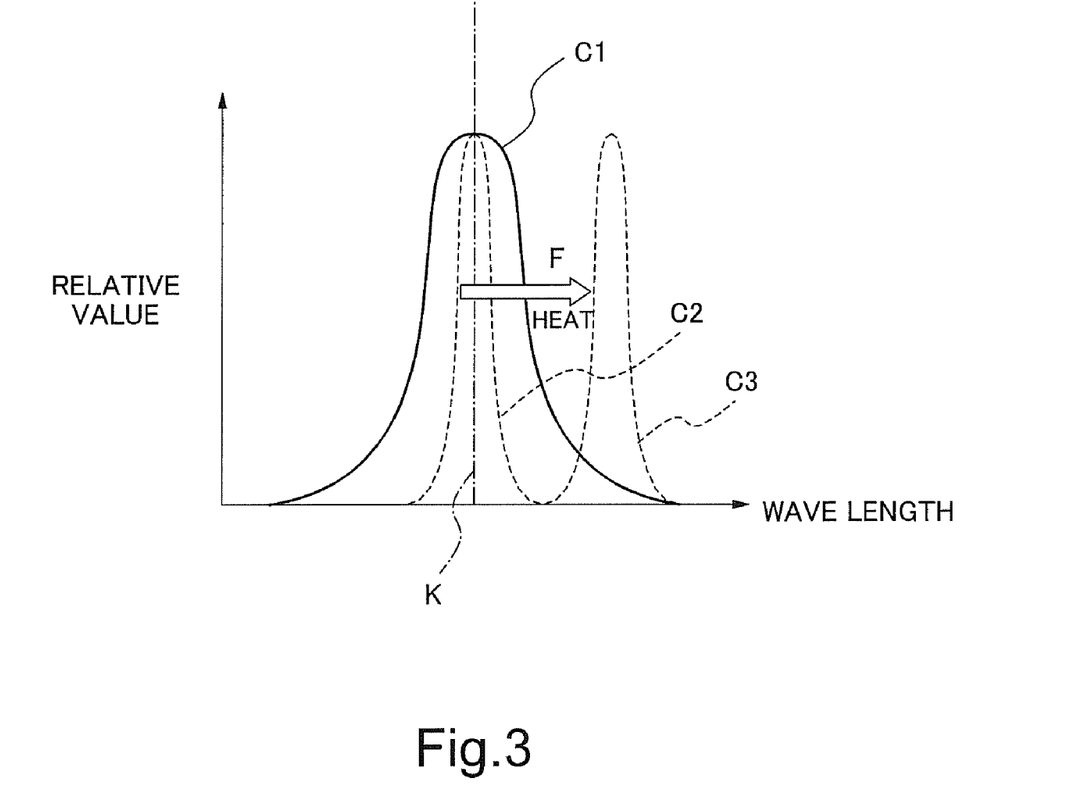
FIG. 3 illustrates a relation between a pass band of a band-pass filter and a wavelength band of a laser diode.

FIG. 3 shows a relation between the pass band of the band-pass filter and distributed wavelengths of the laser diode 2. The horizontal axis indicates wavelength. The vertical axis indicates pass rate of the band-pass filter 4 and also distributed wavelengths of the laser beam which the laser diode 2 outputs, as a relative value.

In FIG. 3, a dashed-dotted line K indicates a central wavelength of the pass band of the band-pass filter 4, and a solid curved line C1 indicates the pass band of the band-pass filter 4. Dotted curved lines C2 and C3 indicate the distributed wavelengths of the laser beam which are outputted from the laser diode 2 at different temperatures each other.

An arrow F indicates that the distributed wavelength of the laser beam is shifted from a position of the curved line C2 to that of the curved line C3 when the laser diode 2 gets heated.

When the central wavelength of the laser beam is shifted, an amount of a light which passes through the band-pass filer 4 changes, and consequently a level of the receiving signal G1 changes also.

For example, in a combination of the laser diode 2 and the band-pass filter 4 for measuring a distance, the central wavelength of the laser beam is shifted in the range of 10 nm to 20 nm according to a temperature of the laser diode 2. Therefore, it is possible to keep a level of the receiving signal G1 within a predetermined range, even if an amount of the receiving light of the laser beam varies due to change of the distance to the target 16.

When a temperature of the laser diode 2 is constant and a wavelength of the laser beam therefrom does not change, a receiving light level fluctuates within a level which is about 106 higher than a predetermined initial value according to a distance to the target. If the temperature of the laser diode 2 is changed and the central wavelength of the laser beam therefrom is shifted from the central wavelength of the pass band of the band pass filter 4, it is possible to keep a level of the receiving signal G1 within a predetermined range.

The main control part 12 measures the distance to the target and the receiving light level signal G5 successively. When the target 16 is distant away, the main control part 12 controls the temperature of the laser diode 2 so that the central wavelength of the laser beam outputted from the laser diode 2 may be coincident with the central wavelength of pass band of the band-pass filter 4. Meanwhile, when the target 16 becomes near, the main control part 12 controls the temperature of the laser diode 2 so that the level of the receiving signal G1 may be kept in the predetermined range. In order to control the temperature of the laser diode 2, the main control part 12 controls the temperature control part 14 according to the receiving signal G1.

Further, when the central wavelength of the laser beam outputted by the laser diode 2 is coincident with the central wavelength of the pass band of the band pass filter 4, the temperature of the laser diode 2 is described as a maximum pass temperature in the exemplary embodiment.

According to the method for controlling temperature of the laser diode 2, the central wavelength of the laser beam is shifted from the central wavelength of the pass band of the band-pass filter 4 through making the temperature of the laser diode higher than the maximum pass temperature, and an amount of lights of the laser beam which passes through the band-pass filter 4 changes. This method is adapted for explanation of the exemplary embodiment.

By the way, the central wavelength of the laser beam is shifted from the central wavelength of the pass band of the band-pass filter 4 when the temperature of the laser diode 2 is lowered than the maximum pass temperature, it is obviously possible to change the amount of lights of the laser beam which passes through the band-pass filter 4.

Thus, the laser distance measuring apparatus according to the exemplary embodiment includes the temperature control part 14 which adjusts the temperature of the laser diode 2, the level detecting part 8 which detects a level of the reflected light passing through the band-pass filter 4, and the main control part 12 which outputs the temperature control signal to the temperature control part 14 so that the receiving light level may be kept in a predetermined range.

As a result, it is possible to satisfy the required precision over the extremely wide dynamic range, since change of a receiving light level due to change of the distance to the target 16 is reduced.

Moreover, since a non-mechanical device, for example, Peltier device is used to adjust a temperature of the laser diode 2, it is possible to avoid degradation of reliability due to use of a mechanical device. Therefore, high reliability can be obtained.

Figure 4:
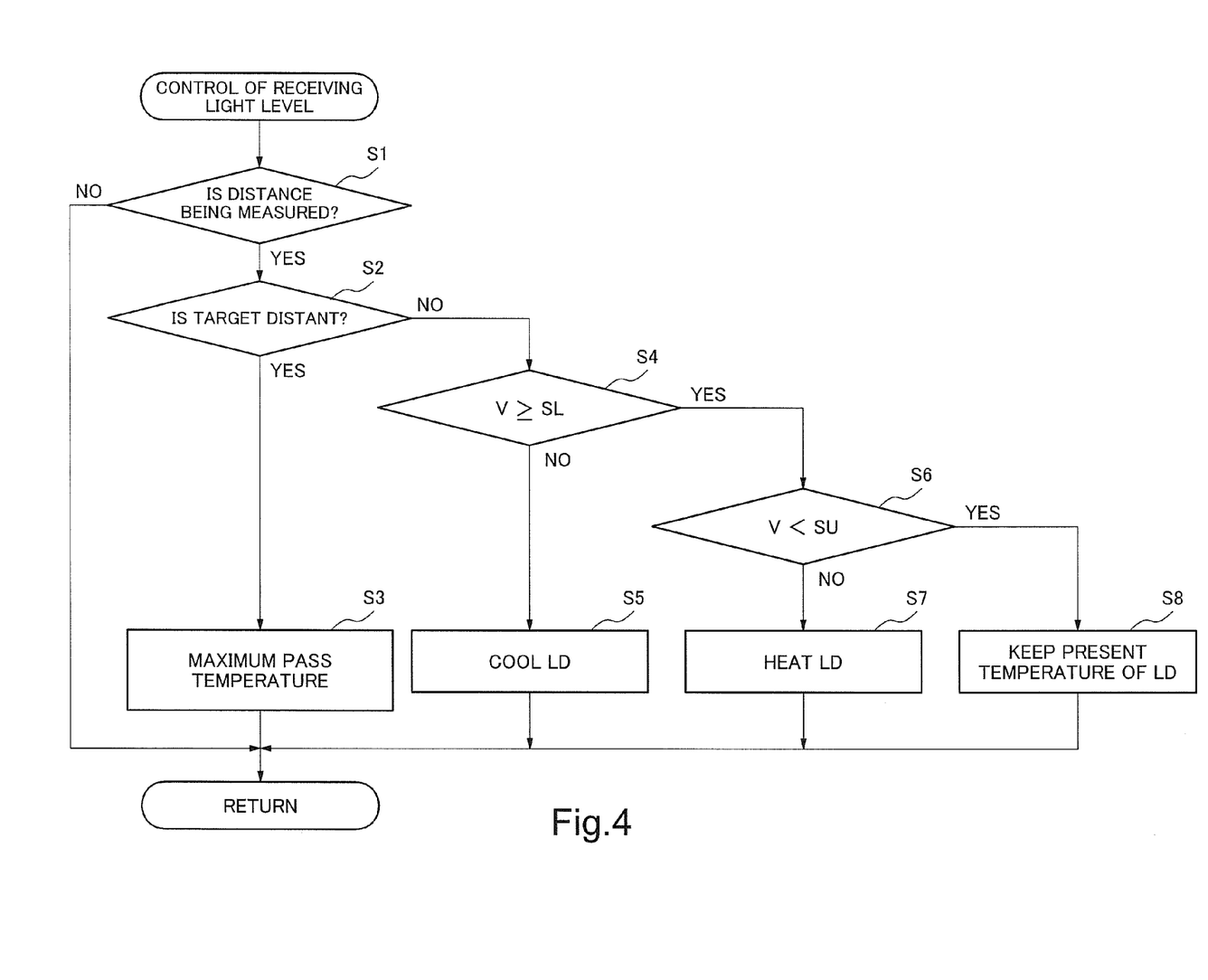
FIG. 4 is a flowchart showing a procedure for controlling a receiving light level.
Figure 5:
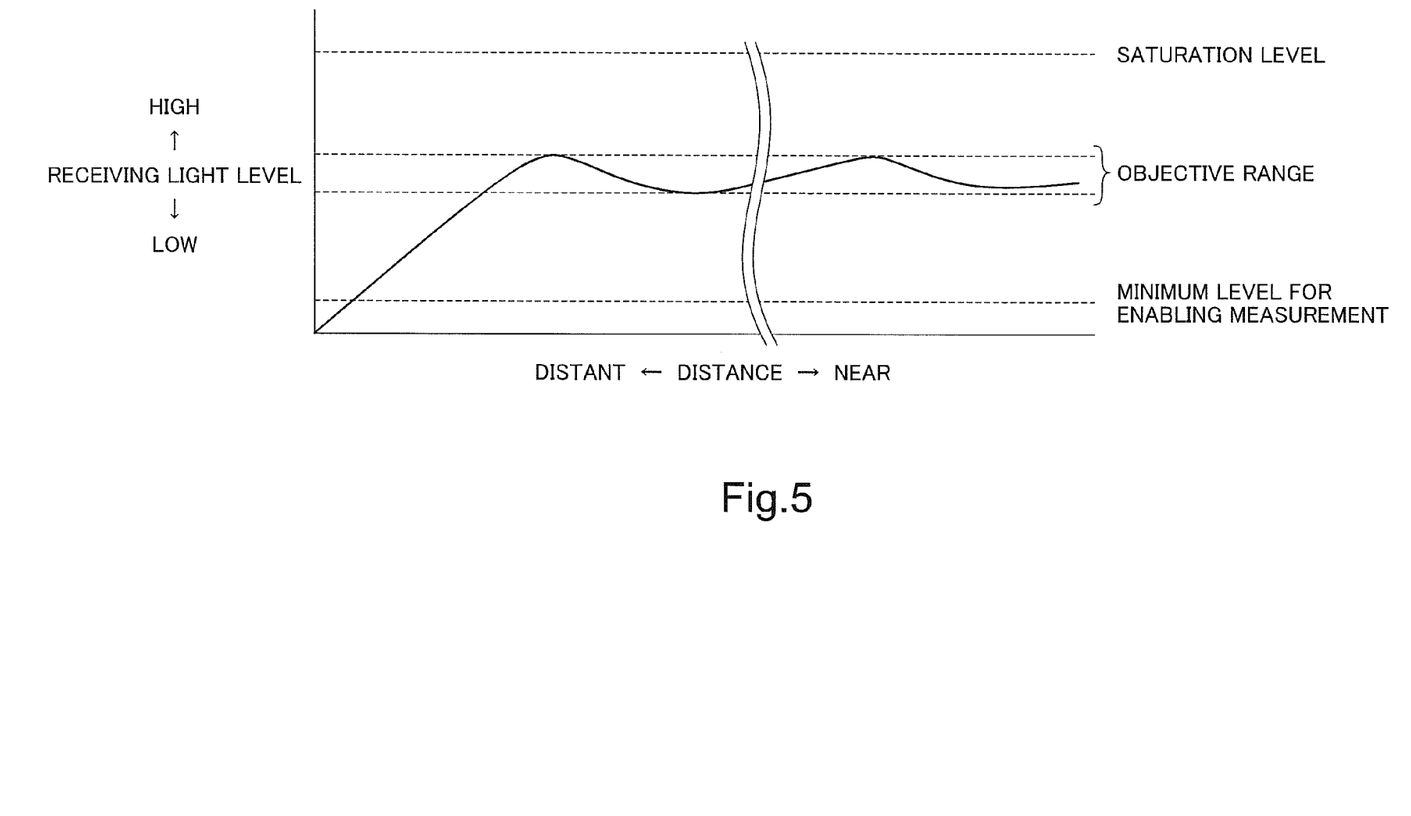
FIG. 5 illustrates controlling the receiving light level.

Next, a specific example of receiving light level control will be described in the following with reference to FIGS. 4 to 6. FIG. 4 is a flowchart showing a procedure for controlling the receiving light level. FIG. 5 shows an effect of the procedure for controlling the receiving light level.

Figure 6A:
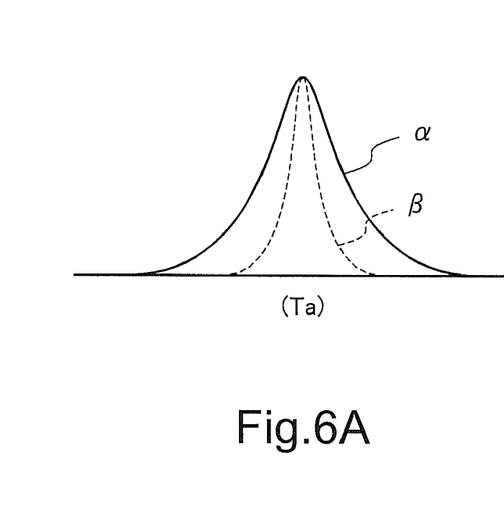
FIGS. 6A to 6C shows a relation between the pass band of the band-pass filter and a distributed wavelength of the laser beam.
Figure 6B:
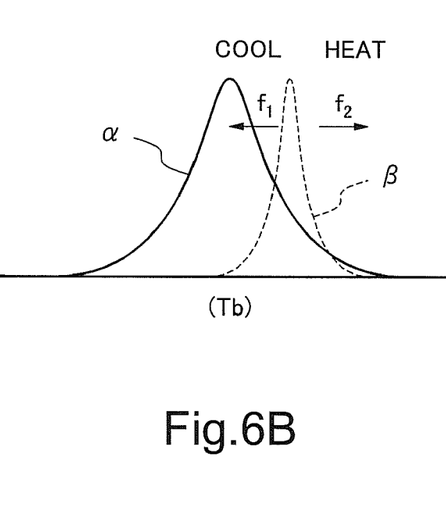
Figure 6C:
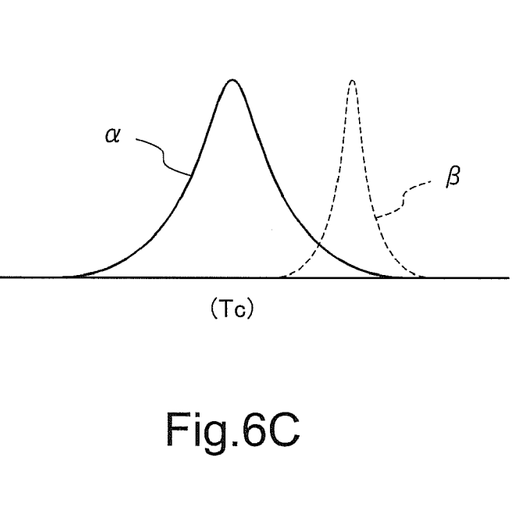

FIGS. 6A to 6C shows relations between a pass band α of the band-pass filter 4 and a distributed wavelength β of the laser beam L which is outputted from the laser diode 2 under temperature control.

FIG. 6A shows a case that the laser diode 2 is set at the maximum pass temperature Ta. In this case, the central wavelength of the laser beam L is coincident with the central wavelength of the pass band of the band-pass filter 4, at the maximum pass temperature Ta.

FIG. 6B indicates a case that the temperature of the laser diode 2 is set at temperature Tb (Tb>Ta) slightly higher than the maximum pass temperature. In this case, the central wavelength of the laser beam L is shifted slightly from the central wavelength of the pass band of the band-pass filter 4.

When the laser diode 2 is cooled down the temperature Tb, the distributed wavelength β of the laser beam L is shifted to a direction indicated by an arrow f1 in FIG. 6B. When the laser diode 2 is heated up the temperature Tb, the distributed wavelength β of the laser beam L is shifted to a direction of an arrow f2.

FIG. 6C indicates a case that the temperature of the laser diode 2 is set at the temperature Tc (Tc>Tb>Ta) higher than the temperature Tb. In this case, the central wavelength of the laser beam L is shifted extremely from the central wavelength of the pass band of the band-pass filter 4.

In following description, a temperature T of the laser diode 2 is set to be the temperature Tb of FIG. 6B.

First, the main control part 12 judges whether or not a distance is currently being measured (S1). When distance is being measured, the main control part 12 judges whether or not the measured distance to the target 16 is longer than the predetermined distance (S2).

When the distance to the target 16 is longer than the predetermined distance, the main control part 12 outputs the temperature control signal G9 to the temperature control part 14 and then, controls a temperature T of the laser diode 2 so that the temperature T may be coincident with the maximum pass temperature Ta (S3).

That is, the main control part 12 shifts the wavelength of the laser beam from a position shown in FIG. 6B to a position shown in FIG. 6A so that the central wavelength of the laser beam may be coincident with the central wavelength of the pass band of the band-pass filter 4.

Meanwhile, when the target 16 is not distant, the main control part 12 judges whether or not a receiving light level V is larger than the minimum level SL of objective range thereof (S4).

The objective range is set to be lower than the level which saturates an amplifier of the light receiving part 7 and higher than the level in which SN ratio can not be effectively measured. When the receiving light level V is lower than the minimum level SL of the objective range of the receiving light level (V<SL), the main control part 12 cools the laser diode 2 and brings the central wavelength of the laser beam L close to the central wavelength of the pass band of the band-pass filter (S5). That is, the main control part 12 controls the temperature T of the laser diode 2 so that the wave length of the laser beam may be shifted from the position shown in FIG. 6B toward the position shown in FIG. 6A

Moreover, when the target 16 is not distant and the receiving light level is higher than the minimum level SL of the objective range of the receiving light level, the main control part 12 compares the receiving light level V with the maximum level SU of the objective range of the receiving light level (S6).

When the receiving light level V is higher than the maximum level SU of the objective range of the receiving light level (V≧SU), the main control part 12 heats the laser diode 2 and shifts the central wavelength of the laser beam L from the central wavelength of the pass band of the band-pass filter (S7). That is, the main control part 12 controls the temperature T of the laser diode 2 so that the wave length of the laser beam may be shifted from the position shown in FIG. 6B toward the position shown in FIG. 6C. Meanwhile, when the receiving light level V is lower than the maximum level SU of the objective range of the received signal level (V<SU), the main control part 12 does not change the current temperature of the laser diode 2 (S8). That is, the main control part 12 controls the temperature T of the laser diode 2 so that the wave length of the laser beam may stay in the position shown in FIG. 6B.

Thus, with regard to the distance measuring method using the laser beam according to the exemplary embodiment of the present invention, the temperature of the laser diode is adjusted based on the receiving light level, and the wavelength of the laser beam outputted by the laser diode is changed so that the receiving light level may be kept in the predetermined range.

As a result, in a range of a middle distance and a short distance at least, the receiving light level V is kept in the objective range of the receiving light level. Accordingly, it is possible to avoid degradation of precision of the distance measurement due to fluctuation of the receiving light level. Consequently, it is possible to satisfy required precision of the distance measurement over the extremely wide dynamic range.

Further, while the temperature of the laser diode is controlled based on judging whether or not the receiving light level is within the predetermined range according to the above mentioned description, the temperature of the laser diode may be controlled in conjunction with the receiving light level. In the latter case, control with high accuracy is possible because the temperature of the laser diode is controlled according to feedback control based on the receiving light level.

The temperature of the laser diode may be controlled based on the distance to the target 16. The control is not affected by noises or the like included in the receiving signal. Consequently, it is possible to stably control the receiving light level.

Further, the above mentioned laser distance measuring apparatus is not necessarily limited to a purpose of space rendezvous in which the transport spacecraft is docked with the artificial satellite and the space station.

Moreover, the above mentioned method for measuring the distance using a laser beam is not bound by the hardware of the apparatus which adopts the method. The above mentioned method can be used as a usual distance measuring method using a laser beam with high flexibility, high generality and high scalability.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A laser distance measuring apparatus which measures a turnaround time after emitting a laser beam outputted from a laser diode to a target until receiving the laser beam reflected by the target by a light receiving module via a band-pass filter to calculate a distance to the target, comprising:
    a temperature control module for adjusting a temperature of the laser diode to change a central wavelength of the laser beam output from the laser diode;
    a level detecting module for detecting a magnitude of light of the reflected laser beam off the target to which the distance from the laser distance measuring apparatus is to be determined, as received via the band-pass filter;
    a main control module for generating a temperature control signal based on the magnitude of the light of the reflected laser beam detected by the level detecting module, the main control module to output the temperature control signal to the temperature control module to adjust the temperature of the laser diode so that the magnitude of the light of the reflected laser beam is kept in a predetermined range sufficient to determine the distance to the target using the reflected laser beam,
    wherein the target is not part of the laser distance measuring apparatus.

2. The laser distance measuring apparatus according to claim 1, wherein
    the main control module outputs the temperature control signal which shift a central wavelength of the laser beam outputted from the laser diode to a central wavelength of a pass band of the band-pass filter when a measured distance to the target is equal to or longer than a predetermined distance.

3. The laser distance measuring apparatus according to claim 1, wherein
    the main control module outputs the temperature control signal which adjusts a temperature of the laser diode according to the magnitude of the light of the reflected laser beam.

4. The laser distance measuring apparatus according to claim 1, wherein
    the main control module outputs the temperature control signal which adjusts a temperature of the laser diode according to the measured distance to the target.

5. A method for measuring distance using a laser beam, comprising:
    measuring a turnaround time after emitting the laser beam outputted from a laser diode to a target until receiving the laser beam reflected by the target via a band-pass filter;
    adjusting a temperature of the laser diode according to a magnitude of light of a received laser beam to change a wavelength of the laser beam outputted from the laser diode so that the magnitude of the light of the received laser beam is kept in a predetermined range sufficient to determine the distance to the target using the received laser beam and,
    calculating a distance to the target based on the turnaround time of laser beam to be reflected and received back as the received laser beam,
    wherein the target is not part of a laser distance measuring apparatus including the laser diode.

6. The method for measuring distance using a laser beam according to claim 5, wherein
    the wavelength of the laser beam outputted from the laser diode is changed through adjusting the temperature of the laser diode according to the distance to the target so that the magnitude of the light of the received laser beam is kept in the predetermined range.

* * * * *